US012767260B2

(12) United States Patent
Ishii

(10) Patent No.: US 12,767,260 B2
(45) Date of Patent: Oct. 20, 2026

(54) COWLING STRUCTURE

(71) Applicant: SUZUKI MOTOR CORPORATION, Hamamatsu (JP)

(72) Inventor: Tatsuki Ishii, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 366 days.

(21) Appl. No.: 18/396,468

(22) Filed: Dec. 26, 2023

(65) Prior Publication Data

US 2024/0262449 A1 Aug. 8, 2024

(30) Foreign Application Priority Data

Feb. 2, 2023 (JP) ................................ 2023-014340

(51) Int. Cl.
*B62J 17/10* (2020.01)
*B62J 17/02* (2006.01)
*B62J 40/10* (2020.01)

(52) U.S. Cl.
CPC ............... *B62J 40/10* (2020.02); *B62J 17/02* (2013.01); *B62J 17/10* (2020.02)

(58) Field of Classification Search
CPC ... B62J 40/10; B62J 17/02; B62J 17/10; B62J 17/00; B62J 17/04; B62J 15/00; B62J 23/00
USPC .......... 296/78.1, 91, 96.11, 180.1, 192, 208; 180/68.1, 68.3, 219, 229
See application file for complete search history.

(56) References Cited

U.S. PATENT DOCUMENTS

| | | | | |
|---|---|---|---|---|
| 10,024,278 | B2 * | 7/2018 | Mizuta | B60Q 1/0408 |
| 2006/0087144 | A1 * | 4/2006 | Kamimura | B62J 17/10 296/78.1 |
| 2016/0090144 | A1 | 3/2016 | Shimizu et al. | B62K 19/48 |
| 2018/0093731 | A1 * | 4/2018 | Nakayama | B62J 17/02 |
| 2021/0114452 | A1 * | 4/2021 | Naruoka | F01P 11/10 |
| 2022/0073165 | A1 * | 3/2022 | Sawada | B62J 17/10 |
| 2024/0262444 | A1 * | 8/2024 | Ishii | B62J 17/02 |
| 2024/0262445 | A1 * | 8/2024 | Ishii | B62J 17/02 |
| 2024/0262446 | A1 * | 8/2024 | Shimizu | B62J 6/022 |

FOREIGN PATENT DOCUMENTS

| | | | |
|---|---|---|---|
| EP | 2949556 | A1 | 12/2015 |
| EP | 3 418 168 | A1 | 5/2018 |
| EP | 3 546 328 | A1 | 3/2019 |

(Continued)

OTHER PUBLICATIONS

English translation of JPH0367797A; https://translationportal.epo.org; Feb. 9, 2026 (Year: 2026).*

(Continued)

*Primary Examiner* — Roger L Pang
(74) *Attorney, Agent, or Firm* — Stein IP, LLC

(57) ABSTRACT

A cowling structure for a straddle-type vehicle. The cowling structure includes a front cowling covering a vehicle front portion from a front side, and a pair of side cowlings covering the vehicle front portion from lateral sides. The pair of side cowlings each include an outer cowling forming an outer surface of the side cowling, and an inner cowling forming an inner surface of the side cowling. The inner cowling is formed with a ventilation hole through which traveling wind passing below the front cowling blows toward a rear side.

11 Claims, 7 Drawing Sheets

(56) References Cited

FOREIGN PATENT DOCUMENTS

| | | | |
|---|---|---|---|
| JP | 3063986 | B2 | 5/2000 |
| JP | 2016-005942 | A | 1/2016 |
| JP | 6432252 | B2 | 11/2018 |

OTHER PUBLICATIONS

Extended European Search Report dated Jun. 6, 2024, issued by the European Patent Office in corresponding application EP 24154454.3.

* cited by examiner

COWLING STRUCTURE

CROSS-REFERENCE TO RELATED APPLICATIONS

This application is based on and claims priority under 35 USC 119 from Japanese Patent Application No. 2023-014340 filed on Feb. 2, 2023, the entire content of which is incorporated herein by reference.

TECHNICAL FIELD

The present invention relates to a cowling structure.

BACKGROUND ART

A straddle-type vehicle such as a motorcycle is known in which a vehicle front portion is covered with a front cowling from a front side, and the vehicle front portion is covered with a pair of side cowlings from lateral sides (for example, see JP2016-005942A). When the straddle-type vehicle described in JP2016-005942A travels, traveling wind flows from the front side to a rear side along outer surfaces of the front cowling and the pair of side cowlings. By a windproof effect of the front cowling and the pair of side cowlings, air resistance that the vehicle receives from the traveling wind is reduced, making it possible to drive with a sense of stability, and an impact of the traveling wind on an occupant is reduced, making the straddle-type vehicle comfortable to drive.

The side cowling described in JP2016-005942A is formed by overlapping an outer cowling and an inner cowling, a width of the side cowling in a left-right direction is increased, and it becomes easier for the traveling wind to hit from the front side. Depending on how the traveling wind hits the side cowling, an upward force may be generated in the vehicle front portion and decrease a load shared by a front wheel. In order to prevent the decrease in the load shared by the front wheel, it is necessary to increase a weight of the vehicle front portion or to complicate a structure of the side cowlings.

SUMMARY OF INVENTION

Aspect of non-limiting embodiments of the present disclosure relates to provide a cowling structure that can improve ground contact property of a front wheel and achieve stable traveling with a simple configuration.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a cowling structure for a straddle-type vehicle, the cowling structure including:

- a front cowling covering a vehicle front portion from a front side; and
- a pair of side cowlings covering the vehicle front portion from lateral sides,
- in which the pair of side cowlings each include:
  - an outer cowling forming an outer surface of the side cowling; and
  - an inner cowling forming an inner surface of the side cowling, and
- in which the inner cowling is formed with a ventilation hole through which traveling wind passing below the front cowling blows toward a rear side.

BRIEF DESCRIPTION OF DRAWINGS

Exemplary embodiment(s) of the present invention will be described in detail based on the following figures, wherein.

DESCRIPTION OF EMBODIMENTS

A straddle-type vehicle according to one aspect of the present invention employs a cowling structure in which a vehicle front portion is covered by a front cowling from a front side, and the vehicle front portion is covered by a pair of side cowlings from lateral sides. An outer surface of each side cowling is formed by an outer cowlings, and an inner surface of each side cowling is formed by an inner cowlings. A ventilation hole is formed in the inner cowling, and the traveling wind below the front cowling easily passes through the ventilation hole of the inner cowling to blow to the rear side. Even in a case where the outer cowling and the inner cowling overlap each other and a width of the side cowling in the left-right direction increases, the air resistance received by the inner cowling from the traveling wind decreases, and an upward force is less likely to be generated at the vehicle front portion. By increasing the load shared by the front wheel, it is possible to improve ground contact property of the front wheel and achieve stable traveling.

Embodiment

Figure 1:
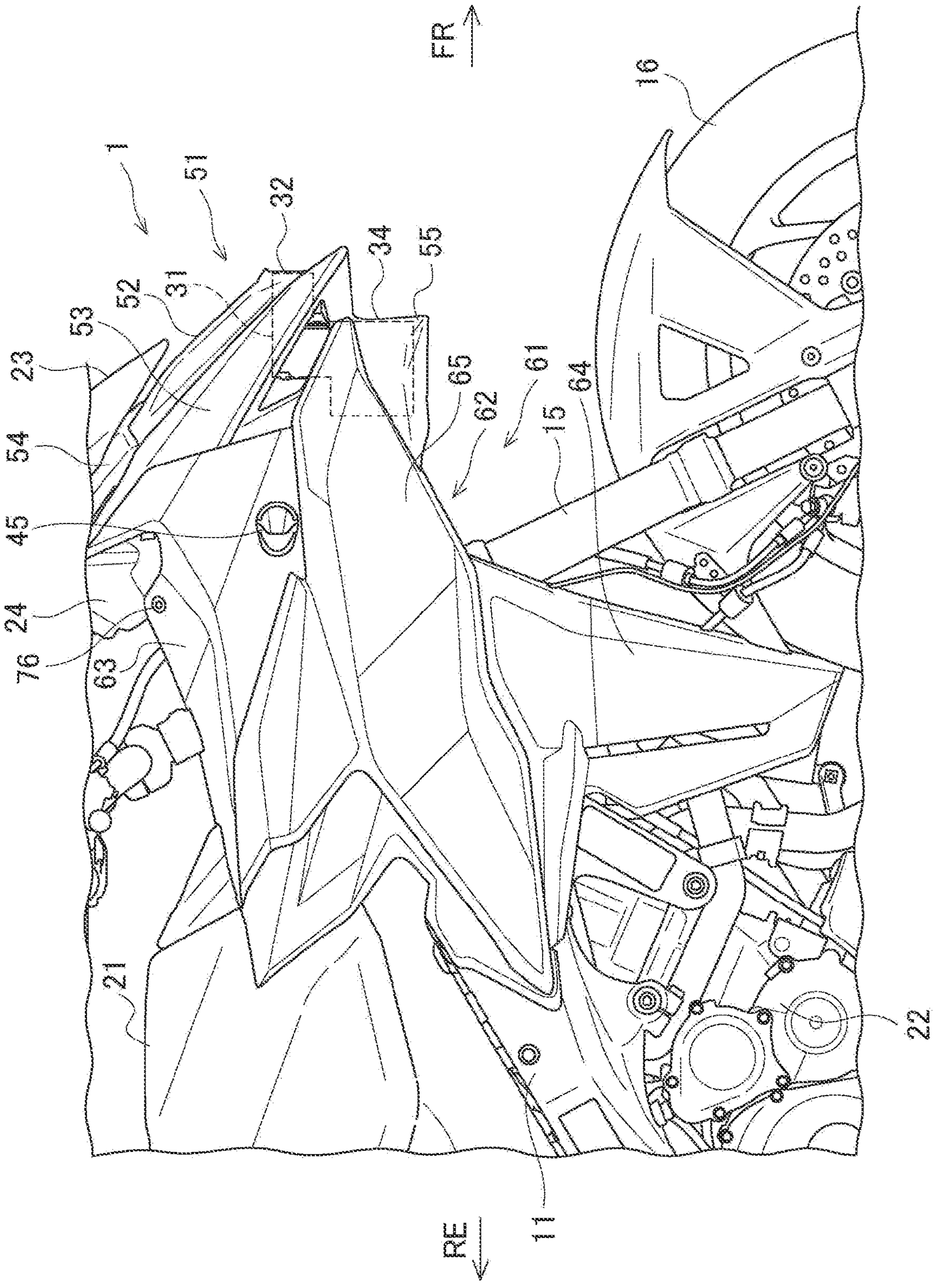
FIG. 1 is a right side view of a vehicle front portion according to an exemplary embodiment of the present invention.
Figure 2:
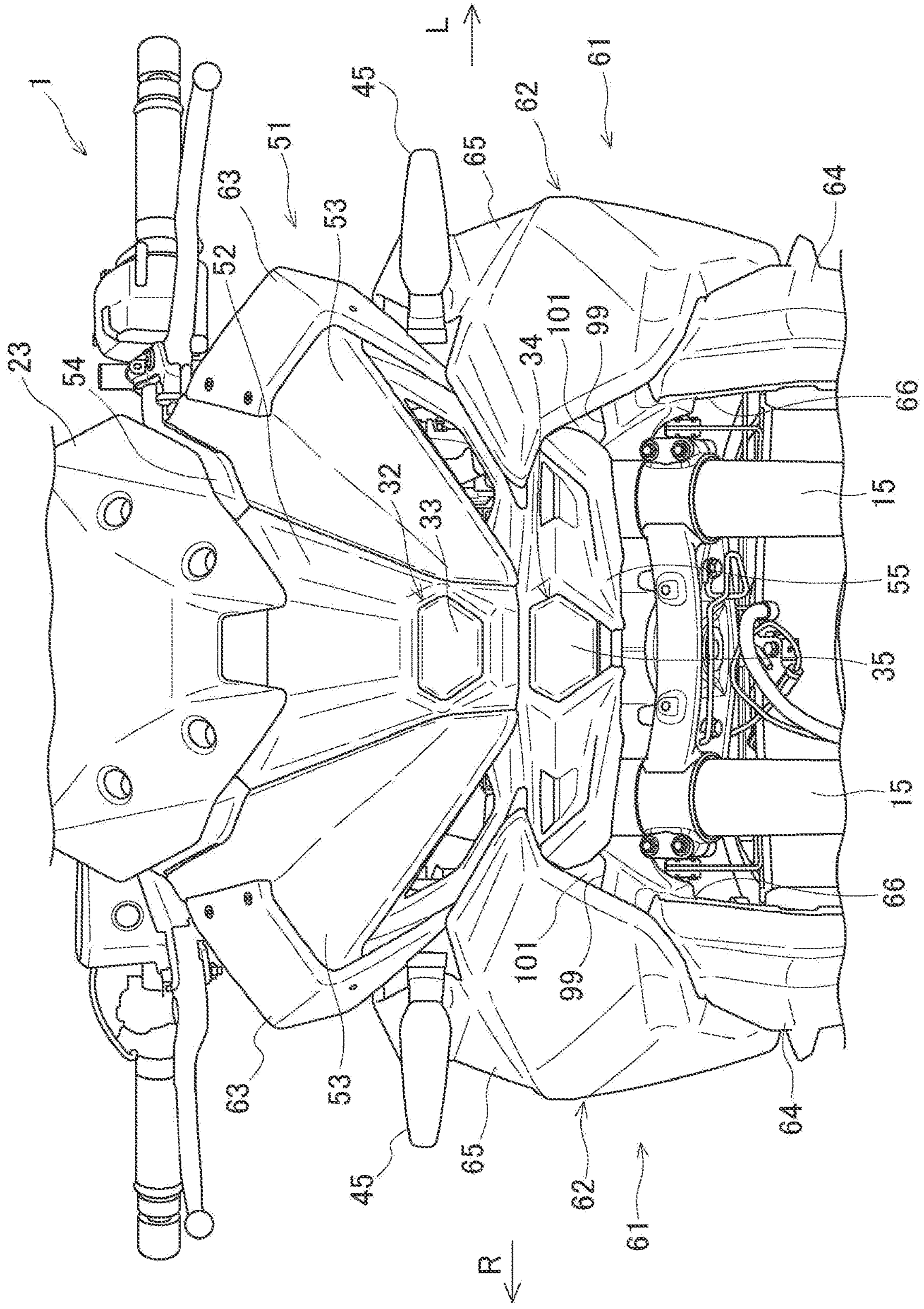
FIG. 2 is a front view of the vehicle front portion according to an exemplary embodiment of the present invention.

Hereinafter, a cowling structure according to the present embodiment will be described with reference to the accompanying drawings. FIG. 1 is a right side view of a vehicle front portion of the present embodiment. FIG. 2 is a front view of the vehicle front portion of the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a front cowling 51 and a pair of side cowlings 61 are provided at the vehicle front portion of a straddle-type vehicle 1. The vehicle front portion is covered by the front cowling 51 from a front side. The vehicle front portion is covered by the pair of side cowlings 61 from lateral sides. A front fork 15 protrudes toward a lower side from the side cowling 61. A front wheel 16 is rotatably supported at a lower portion of the front fork 15. A main frame 11 protrudes toward a rear side from the side cowling 61. A fuel tank 21 is provided on an upper side of the main frame 11. An engine 22 is provided on the lower side of the main frame 11.

A front end side of the front cowling 51 is formed into a beak shape, in a side view. A front surface of the front cowling 51 is inclined obliquely rearward and upward from a front end. A windscreen 23 for wind protection is attached to the upper side of the front surface of the front cowling 51. A lower surface of the front cowling 51 is formed in two upper and lower stages. The lower surface on the rear side of the front cowling 51 is one step lower than the lower surface on the front side of the front cowling 51. A meter cover 24 is attached to the rear side of the front cowling 51. A headlamp unit 31 including an upper headlamp 32 and a lower headlamp 34 is positioned inside the front cowling 51.

The pair of side cowlings 61 extends, toward the rear side, from the front cowling 51 to the front side of the fuel tank 21, and extends, toward the lower side, from the front cowling 51 to the rear side of the front wheel 16. Similarly to the front end side of the front cowling 51, a front end side of each side cowling 61 (outer middle cowling 65) is also formed into a beak shape, in side view. The upper side of a front edge of each side cowling 61 is inclined obliquely upward and rearward from a front end. The lower side of the front edge of each side cowling 61 is inclined obliquely downward and rearward from the front end. The pair of side cowlings 61 are connected to the rear side of the front cowling 51, and a streamline shape that reduces air resistance from traveling wind is formed at the vehicle front portion of the straddle-type vehicle 1.

As shown in FIGS. 1 and 2, the center of the front surface of the front cowling 51 is formed by a front center cowling 52, and both left and right sides of the front surface of the front cowling 51 are formed by a pair of front side cowlings 53. The upper side of the front surface of the front cowling 51 is formed by a front upper cowling 54, and the lower side of the front surface of the front cowling 51 is formed by a front lower cowling 55. A lens surface 33 of the upper headlamp 32 is exposed to the front side through an opening of the front center cowling 52. A lens surface 35 of the lower headlamp 34 is exposed to the front side through an opening of the front lower cowling 55.

An outer surface of each of the pair of side cowlings 61 is formed by an outer cowlings 62. An inner surface of each of the pair of side cowlings 61 is formed by an inner cowlings 66. The outer cowling 62 is formed by combining an outer upper cowling 63, an outer lower cowling 64, and an outer middle cowling 65. A turn signal lamp 45 protrudes laterally from the outer upper cowling 63. The outer cowling 62 and the inner cowling 66 are overlapped in a left-right direction to form each side cowling 61 hollow. A space for accommodating electrical components is positioned inside each side cowling 61.

The straddle-type vehicle 1 described above has an upright riding position, and if the front end of the front cowling 51 is high, an upward force is likely to be generated at the vehicle front portion. In particular, the lower side of the front edge of the side cowling 61 is inclined obliquely downward and rearward, and in a case where the traveling wind hits the side cowling 61, an upward force is generated at the vehicle front portion. If the upward force is applied at a location away from the center of gravity of the vehicle, a load shared by the front wheel is significantly decreased, which may result in unstable behavior when driving at high speeds. Therefore, in the straddle-type vehicle 1 of the present embodiment, a ventilation hole 99 is formed in the inner cowling 66, and the upward force received by the side cowling 61 from the traveling wind is decreased.

Figure 3:
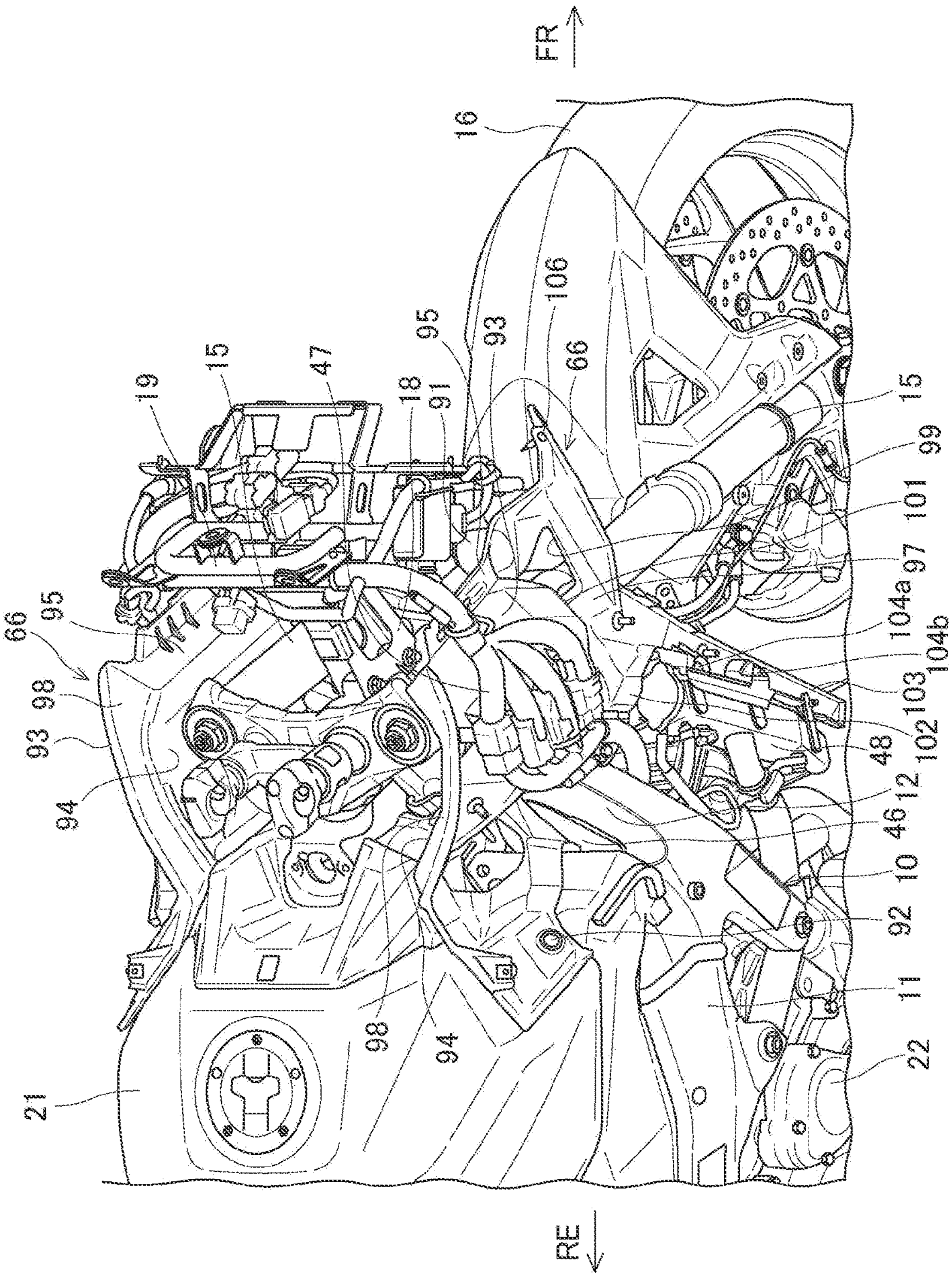
FIG. 3 is a perspective view showing an internal structure of the vehicle front portion according to an exemplary embodiment of the present invention.
Figure 4:
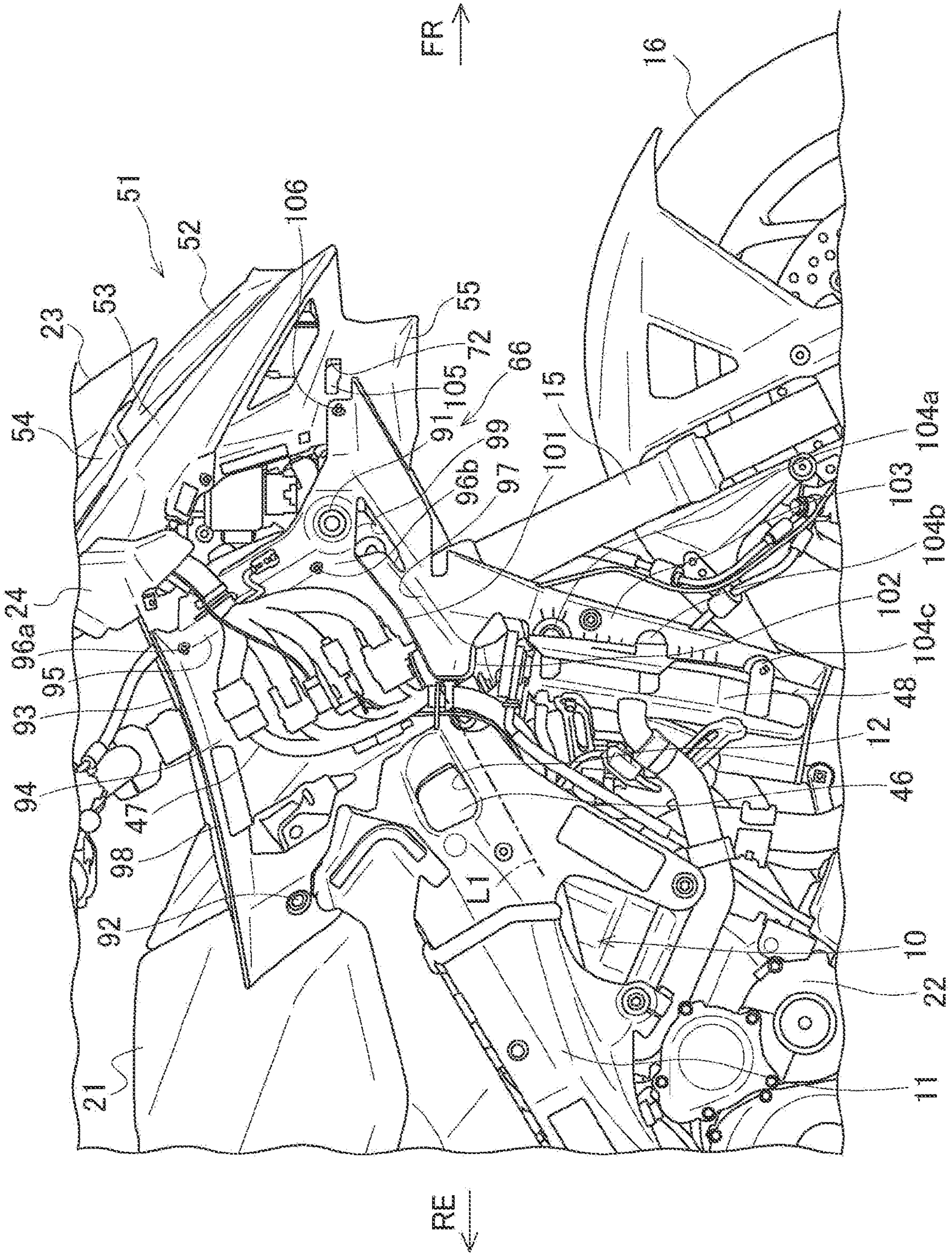
FIG. 4 is a right side view in which a part of a cowling is removed from the vehicle front portion according to an exemplary embodiment of the present invention.
Figure 5:
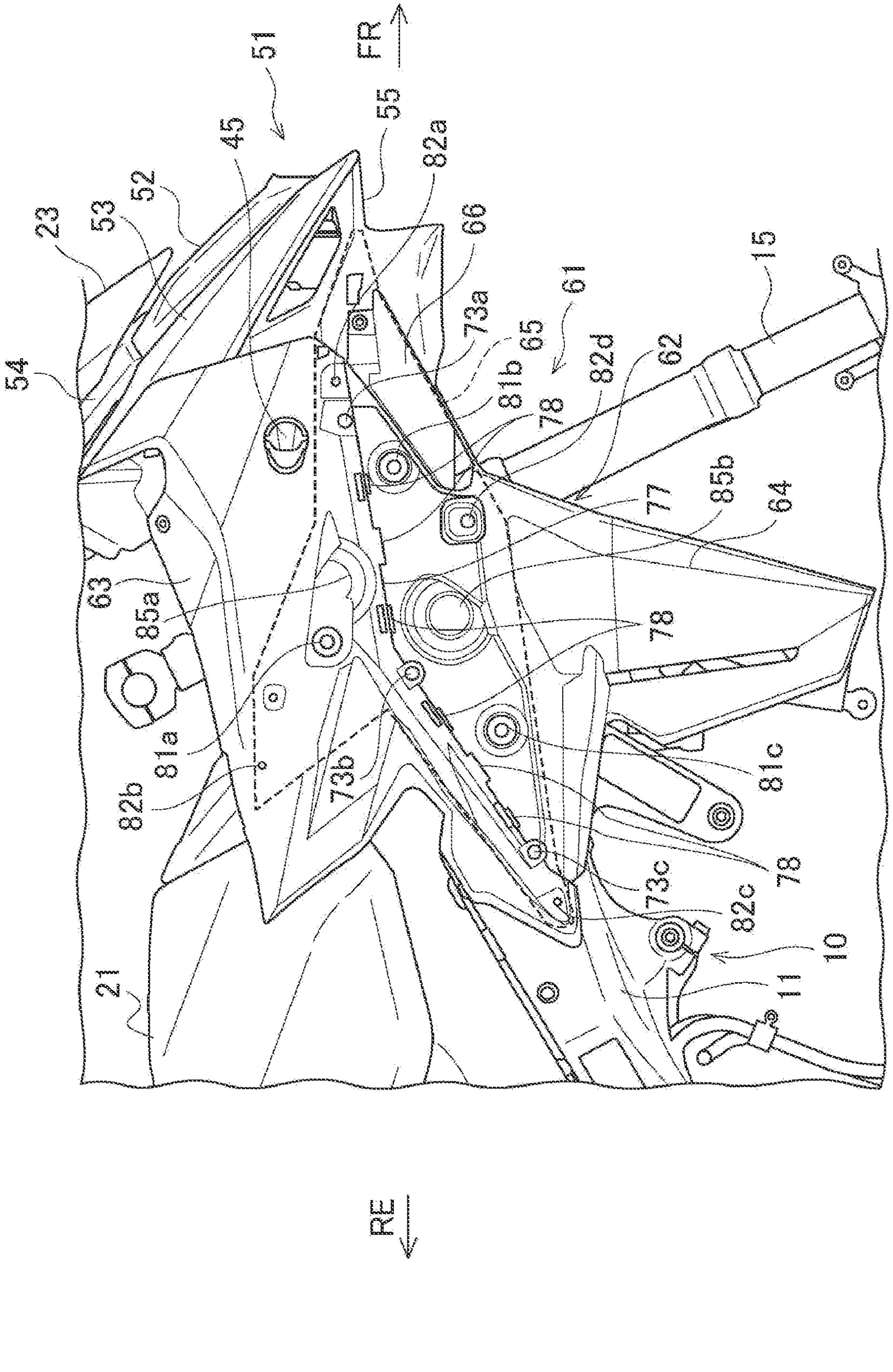
FIG. 5 is a right side view in which a part of the cowling is removed from the vehicle front portion according to an exemplary embodiment of the present invention.

The cowling structure will be described with reference to FIGS. 3 to 5. FIG. 3 is a perspective view showing an internal structure of the vehicle front portion of the present embodiment. FIGS. 4 and 5 are right side views in which a part of the cowling is removed from the vehicle front portion of the present embodiment. FIG. 3 shows a state in which the front cowling and the outer cowling are removed, and FIG. 4 shows a state in which the outer cowling is removed. In FIG. 5, the outer middle cowling is indicated by a two-dot chain line.

As shown in FIG. 3, a cowling brace 19 is supported by a front portion of a vehicle body frame 10 via a brace bracket 18. The cowling brace 19 is formed by integrating a metal pipe and a metal bracket by welding. The headlamp unit 31 (see FIG. 1) and the front cowling 51 (see FIG. 1) are supported by the front side of the cowling brace 19. Respective tubular front fixing portions 91 protruding toward an inner side in the vehicle width direction from front sides of the pair of inner cowling 66 are screwed to left and right sides of the cowling brace 19. The pair of inner cowlings 66 are connected to each other via the cowling brace 19.

The rear sides of positions along front edges of the pair of inner cowlings 66 bulge toward the inner side in the vehicle width direction. A side wall 94 of a bulging portion 93 of each inner cowling 66 is curved in an arch shape in a top view not to interfere with the front fork 15. More specifically, the side wall 94 of the bulging portion 93 curves toward an outer side in the vehicle width direction from a front end to an intermediate portion, and the side wall 94 of the bulging portion 93 curves toward the inner side in the vehicle width direction from the intermediate portion to a rear end. Accordingly, even when the front fork 15 swings, a distance between the front fork 15 and the bulging portion 93 of the inner cowling 66 is appropriately maintained. A rear fixing portion 92 located on the rear side of the bulging portion 93 is screwed to the fuel tank 21.

As shown in FIGS. 3 and 4, the bulging portion 93 having a rectangular shape in a side view is located on the rear side of the front cowling 51, a front wall 95 of the bulging portion 93 is inclined obliquely upward to the rear side, and a lower wall 97 of the bulging portion 93 is inclined obliquely downward to the rear side. The ventilation hole 99 is formed on the front side of the lower wall 97 of the bulging portion 93. Traveling wind passing through the lower side of the front cowling 51 blows toward the rear side through the ventilation hole 99. Even if the lower wall 97 of the bulging portion 93 is inclined obliquely downward to the rear side, since the traveling wind blows toward the rear side through the ventilation hole 99, upward force is less likely to be generated at the vehicle front portion. Since the front fixing portion 91 is positioned directly above the ventilation hole 99, vibration when traveling wind passes through the ventilation hole 99 is reduced.

The inner cowling 66 is formed with a wind guide wall 101 extending obliquely rearward to the rear side from an upper edge of the ventilation hole 99. The wind guide wall 101 is inclined at a shallow angle with respect to a horizontal direction. Even in a case where traveling wind flows in the horizontal direction from the ventilation hole 99, the traveling wind does not hit the wind guide wall 101 strongly. The wind guide wall 101 smoothly guides the traveling wind entered the ventilation hole 99 rearward, thereby reducing air resistance that the inner cowling 66 receives from the traveling wind. In addition, the wind guide wall 101 is positioned at the back of the ventilation hole 99, in a front view, the inside of the inner cowling 66 is hidden by the wind guide wall 101, and appearance is improved (see FIG. 2).

An opening 12 continuous with an inlet 46 of an air cleaner (not shown) is formed in a front portion of the main frame 11. The wind guide wall 101 extends from the ventilation hole 99 toward the inlet 46 of the air cleaner, and the wind guide wall 101 guides traveling wind to the inlet 46 of the air cleaner, thereby improving air intake efficiency. In this case, in a side view, an extension line L1 obtained by extending a downstream wall surface of the wind guide wall 101 is located on the lower side of the inlet 46 of the air cleaner. By the traveling wind passing through the wind guide wall 101, a direction of the traveling wind is directed downward than the inlet 46 of the air cleaner, and intrusion of foreign matters such as sand into the inlet 46 of the air cleaner is reduced.

An accommodation space for electrical components is formed inside the bulging portion 93 of the inner cowling 66. A harness 47 is installed as an electrical component in the accommodation space. The wind guide wall 101 extends to separate the accommodation space and a flow path of the traveling wind entering from the ventilation hole 99. Thus, even in a case where foreign matters such as sand or water droplets enter from the ventilation hole 99, the harness 47 is protected from the foreign matters by the wind guide wall 101. The outer cowling 62 (see FIG. 1) is superposed on the inner cowling 66, and rigidity of the side cowling 61 is increased by a hollow closed section. The harness 47 is hidden inside the side cowling 61, and thus the appearance is improved, and the harness 47 is protected from flying stones or the like.

An upper wall 98 protrudes toward the outer cowling 62 from an upper end of the side wall 94 of the inner cowling 66 (bulging portion 93). The upper wall 98 of the inner cowling 66 extends in a front-rear direction similarly to the wind guide wall 101, and the upper wall 98 of the inner cowling 66 and the wind guide wall 101 face each other in an upper-lower direction. The inner cowling 66 is reinforced by a concave cross section formed by the upper wall 98, the wind guide wall 101, and the side wall 94 of the inner cowling 66, and the rigidity of the inner cowling 66 is increased. In this way, the wind guide wall 101 not only guides the traveling wind, but also functions as a separation wall that separates the accommodation space and the flow path, and a rib that reinforces the bulging portion 93.

A radiator 48 is provided on the lower side of the vehicle front portion. A partition wall 102 protrudes from the side wall 94 of the inner cowling 66 toward the outer cowling 62 to partition the inside of the inner cowling 66 and the upper side of the radiator 48. Hot air flowing upward from the radiator 48 is blocked by the partition wall 102. Thus, heat damage to the harness 47 installed in the inner cowling 66 is reduced. Although the partition wall 102 of the inner cowling 66 is connected to a rear end of the wind guide wall 101 and partially blocks the flow path of the traveling wind, an amount of protrusion of the partition wall 102 is reduced to the minimum so that a flow of the traveling wind is not strongly blocked.

An extending portion 103 extends downward from the bulging portion 93 of the inner cowling 66. The lower fixing portions 104*a* to 104*c* of the extending portion 103 are screwed to the radiator 48. The front fixing portions 91, the rear fixing portions 92, and the lower fixing portions 104*a* to 104*c*, which are spaced apart in the front-rear and upper-lower directions of the inner cowling 66, are screwed to the vehicle front portion, thereby stably supporting the side cowling 61. The extending portion 103 extends along a side surface of the radiator 48 in front of the radiator 48. The extending portion 103 functions as a wind guide plate configured to guide traveling wind to the radiator 48, and cooling efficiency is improved by the traveling wind flowing to the radiator 48 along the extending portion 103.

The front cowling 51 is formed by three-dimensionally combining cowling members of the front center cowling 52, the pair of front side cowlings 53, the front upper cowling 54, and the front lower cowling 55. The adjacent cowling members are clipped to each other. Further, the meter cover 24 is clipped to the pair of the front side cowlings 53 and the front upper cowling 54. The front wall 95 of the bulging portion 93 of the inner cowling 66 is in contact with the meter cover 24, and two upper and lower portions 96*a* and 96*b* of the front wall 95 of the bulging portion 93 are clipped to the meter cover 24.

An insertion hole 72 is formed in the front lower cowling 55, and a hook 105 is formed in the inner cowling 66. The hook 105 is inserted into the insertion hole 72, and the front lower cowling 55 and the inner cowling 66 are latched. The vicinity of a tip end of the inner cowling 66 is in contact with the front lower cowling 55, and a tip end portion 106 of the inner cowling 66 is clipped to the front lower cowling 55. The outer upper cowling 63 (see FIG. 1) is in contact with the meter cover 24, and a front portion 76 (see FIG. 1) of the outer upper cowling 63 is screwed to the meter cover 24.

Thus, an upper portion of the front cowling 51 is fixed to the front wall 95 of the bulging portion 93 and the front portion 76 of the outer cowling 62 via the meter cover 24, and a lower portion of the front cowling 51 is fixed to the tip end portion 106 of the inner cowling 66. Since the pair of side cowlings 61 are supported at a plurality of positions in the vehicle front portion, the pair of side cowlings 61 function as a support structure of the front cowling 51 together with the cowling brace 19. As described above, the rigidity of the pair of side cowlings 61 is sufficiently increased, and thus the front cowling 51 is stably supported by the pair of side cowlings 61.

As shown in FIG. 5, the outer upper cowling 63 and the outer lower cowling 64 are attached to the inner cowling 66. The outer upper cowling 63 faces an upper region of the inner cowling 66, and the outer lower cowling 64 faces a lower region of the inner cowling 66. A lower edge of the outer upper cowling 63 is connected to an upper edge of the outer lower cowling 64, and the outer middle cowling 65 is attached to cover a joint 77 between the outer upper cowling 63 and the outer lower cowling 64 from the outer side in the vehicle width direction.

A plurality of hooks (not shown) are formed at the lower edge of the outer upper cowling 63, and a plurality of insertion holes 78 are formed at the upper edge of the outer lower cowling 64. The hooks are inserted into the insertion holes 78 to latch the outer upper cowling 63 and the outer lower cowling 64. Fixing portions 73*a* to 73*c* are formed at three positions spaced apart in an extending direction of the lower edge of the outer upper cowling 63. The fixing portions 73*a* to 73*c* at the three positions are screwed to the upper edge of the outer lower cowling 64. The outer upper cowling 63 and the outer lower cowling 64 are connected at a plurality of positions along the joint 77.

A clip hole 81*a* is formed in the middle of the outer upper cowling 63 in the front-rear direction. A clip hole 81*b* is formed on the front side of the outer lower cowling 64 in the front-rear direction. A clip hole 81*c* is formed on the rear side of the outer lower cowling 64 in the front-rear direction. Three clips (not shown) corresponding to the clip holes 81*a* to 81*c* are provided on an inner surface of the outer middle cowling 65. The clips of the outer middle cowling 65 are inserted into the clip holes 81*a* to 81*c* of the outer upper cowling 63 and the outer lower cowling 64, from the outer side in the vehicle width direction, to position the outer middle cowling 65.

Fixing portions 82*a* to 82*d* corresponding to the front side, the rear side, the upper side, and the lower side of the outer middle cowling 65 are formed in the outer upper cowling 63 and the outer lower cowling 64. The fixing portion 82*a* is located in front of the clip hole 81*b*. The fixing portion 82*b* is located above the clip hole 81*a*. The fixing portion 82*c* is located behind the clip hole 81*c*. The fixing portion 82*d* is located below a straight line passing through the clip holes 81*b* and 81*c*. The outer middle cowling 65 is screwed to the four fixing portions 82*a* to 82*d* of the outer upper cowling 63 and the outer lower cowling 64.

The joint 77 between the outer upper cowling 63 and the outer lower cowling 64 is covered with the outer middle cowling 65. Thus, the appearance of the straddle-type vehicle 1 improves. In this case, the outer upper cowling 63 and the outer lower cowling 64 are screwed to the outer middle cowling 65 from the inner side in the vehicle width direction. No screw holes pass through the outer middle cowling 65, and fastening members of the cowling members are not exposed to the outside. By assembling the outer cowling 62 in advance, the work of attaching the outer cowling 62 to the inner cowling 66 becomes easier.

Further, although there is a gap at the joint 77 between the outer upper cowling 63 and the outer lower cowling 64, the gap is covered by the outer middle cowling 65. Thus, an allowable width of the gap is widened. The fixing portion 82*b* at a fixing position of the outer upper cowling 63 and the outer middle cowling 65, and the fixing portion 82*d* at a fixing position of the outer lower cowling 64 and the outer middle cowling 65 are located at opposite side with respect to the joint 77. Two portions spaced apart in the upper-lower direction of the outer upper cowling 63 and the outer lower cowling 64 are connected to each other via the outer middle cowling 65, thereby increasing the overall rigidity of the outer cowling 62.

The outer upper cowling 63 and the outer lower cowling 64 are manufactured by injection molding in which a mold is filled with molten resin. Therefore, gate marks 85*a* and 85*b* remain on the outer upper cowling 63 and the outer lower cowling 64. The gate marks 85*a* and 85*b* are covered with the outer middle cowling 65. Since the gate marks 85*a* and 85*b* are hidden by the outer middle cowling 65, the gate at the time of injection molding is increased in size to improve the degree of freedom in design without considering the influence on the appearance of the outer upper cowling 63 and the outer lower cowling 64.

Figure 6:
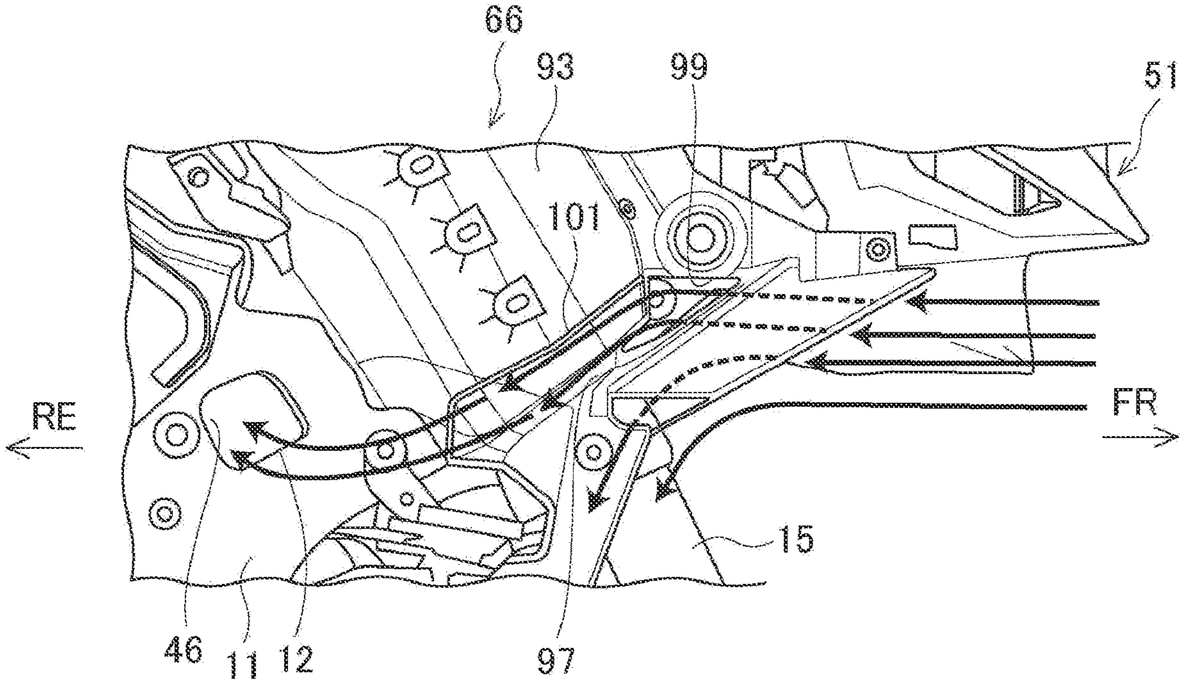
FIG. 6 is a view showing a flow of traveling wind when an inner cowling according to an exemplary embodiment of the present invention is viewed from an outer side in a vehicle width direction.
Figure 7:
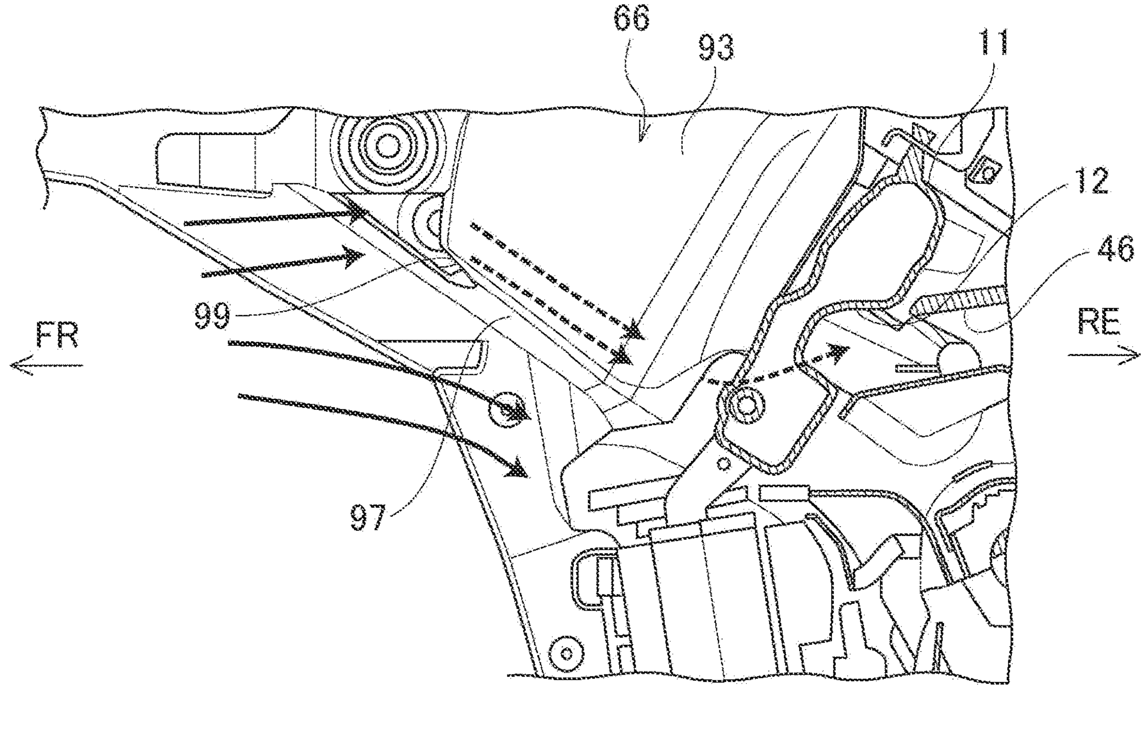
FIG. 7 is a view showing a flow of traveling wind when the inner cowling according to an exemplary embodiment of the present invention is viewed from an inner side in the vehicle width direction.
Figure 8:
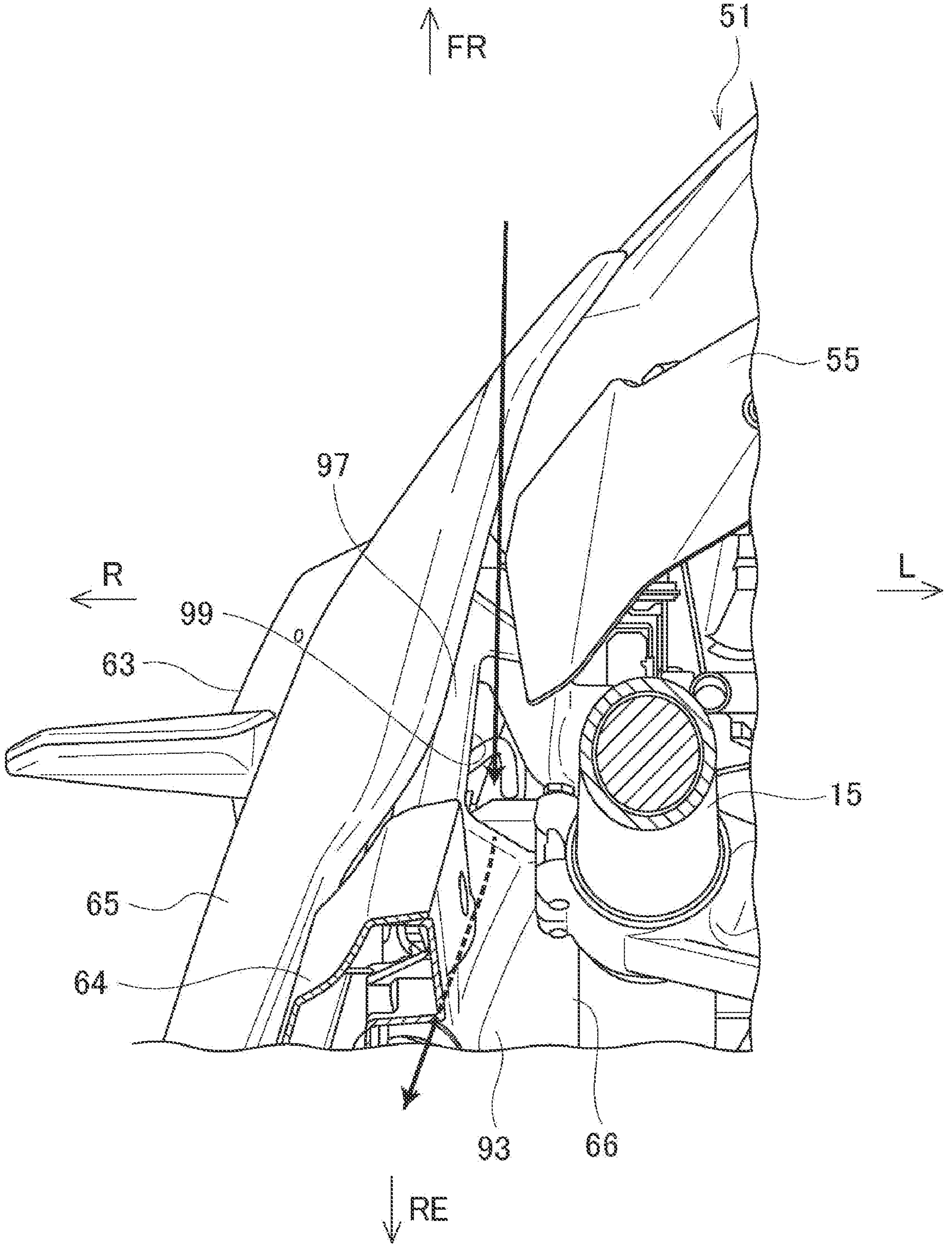
FIG. 8 is a view showing a flow of traveling wind when the inner cowling according to an exemplary embodiment of the present invention is viewed from a lower side.

The flow of traveling wind in the inner cowling will be described with reference to FIGS. 6 to 8. FIG. 6 is a view showing a flow of traveling wind when the inner cowling of the present embodiment is viewed from the outer side in the vehicle width direction. FIG. 7 is a view showing a flow of traveling wind when the inner cowling of the present embodiment is viewed from the inner side in the vehicle width direction. FIG. 8 is a view showing a flow of traveling wind when the inner cowling of the present embodiment is viewed from the lower side. In FIG. 6, the harness is omitted.

As shown in FIGS. 6 to 8, when the vehicle is traveling, traveling wind flows along the front surface of the front cowling 51, and the traveling wind enters the lower side of the front cowling 51. On the rear side of the front cowling 51, the inner cowling 66 bulges toward the inner side in the vehicle width direction, and the lower wall 97 of the bulging portion 93 of the inner cowling 66 is inclined obliquely downward to the rear side. A part of the traveling wind on the lower side of the front cowling 51 flows along an outer surface of the bulging portion 93, and the remaining traveling wind enters the inside of the bulging portion 93 from the ventilation hole 99 and flows to the rear side. Since the air resistance at the lower wall 97 of the bulging portion 93 is reduced, an upward force is less likely to be generated at the vehicle front portion.

The traveling wind inside the inner cowling 66 is guided obliquely downward to the rear side by the wind guide wall 101. The accommodation space for the harness 47 (see FIG. 3) and the flow path of the traveling wind are separated by the wind guide wall 101. The wind guide wall 101 makes it difficult for foreign matters such as sand carried by the traveling wind to enter the accommodation space. The opening 12 of the main frame 11 is positioned downstream of the wind guide wall 101, and a part of the traveling wind enters the inlet 46 of the air cleaner through the opening 12, thereby improving the air intake efficiency. The wind guide wall 101 directs the flow of the traveling wind to the lower side of the opening 12, and the traveling wind heads toward the opening 12 in an arc, making it difficult for foreign matters to be carried to the inlet 46 by the traveling wind.

As described above, according to the cowling structure of the present embodiment, the traveling wind below the front cowling 51 easily passes through the ventilation hole 99 of the inner cowling 66 to blow to the rear side. Even in a case where the outer cowling 62 and the inner cowling 66 overlap each other and a width of the side cowling 61 in the left-right direction increases, the air resistance received by the inner cowling 66 from the traveling wind decreases, and an upward force is less likely to be generated at the vehicle front portion. By increasing the load shared by the front wheel, it is possible to improve ground contact property of the front wheel 16 and achieve stable traveling.

In the present embodiment, the front cowling is formed by combining a plurality of cowling members. Alternatively, the front cowling may be formed by one cowling member.

Further, in the present embodiment, the outer cowling is formed by combining a plurality of cowling members. Alternatively, the outer cowling may be formed by one cowling member.

Further, in the present embodiment, the ventilation hole is formed on the lower surface of the bulging portion of the inner cowling. Alternatively, the ventilation hole may be formed at a position where an upward force is easily generated when the inner cowling is exposed to the traveling wind.

Further, in the present embodiment, the wind guide wall is formed in the inner cowling. Alternatively, the wind guide wall may not be formed in the inner cowling.

Further, in the present embodiment, the accommodation space for the harness is formed in the inner cowling. Alternatively, an electrical component other than the harness may be accommodated in the accommodation space of the inner cowling.

Further, the cowling structure according to the present embodiment is not limited to the above-described straddle-type vehicle, and may be used in other types of straddle-type vehicles. The straddle-type vehicle is not limited to a general vehicle in which a driver rides on a seat in a posture of straddling the seat, and includes a scooter-type vehicle in which the driver rides on the seat without straddling the seat.

As described above, a first aspect relates to a cowling structure for a straddle-type vehicle, the cowling structure including: a front cowling (51) covering a vehicle front portion from a front side; and a pair of side cowlings (61) covering the vehicle front portion from lateral sides, in which the pair of side cowlings each include: an outer cowling (62) forming an outer surface of the side cowling; and an inner cowling (66) forming an inner surface of the side cowling, and the inner cowling is formed with a ventilation hole (99) through which traveling wind passing below the front cowling blows toward a rear side. According to this configuration, the traveling wind below the front cowling easily passes through the ventilation hole of the inner cowling to blow to the rear side. Even in a case where the outer cowling and the inner cowling overlap each other and a width of the side cowling in the left-right direction increases, the air resistance received by the inner cowling from the traveling wind decreases, and an upward force is less likely to be generated at the vehicle front portion. By increasing the load shared by the front wheel, it is possible to improve ground contact property of the front wheel and achieve stable traveling.

A second aspect is directed to the first aspect, in which the inner cowling is formed with a bulging portion (93) bulging toward an inner side in a vehicle width direction, a lower wall (97) of the bulging portion is inclined obliquely downward to the rear side below the front cowling, and the ventilation hole is formed in the lower wall of the bulging portion. According to this configuration, even in a case where the lower wall of the bulging portion of the inner cowling is inclined obliquely downward to the rear side, since the traveling wind blows toward the rear side through the ventilation hole of the lower wall of the bulging portion, upward force is less likely to be generated at the vehicle front portion.

A third aspect is directed to the first aspect and the second aspect, in which the inner cowling is formed with a wind guide wall (101) configured to guide, to the rear side, traveling wind entered the ventilation hole. According to this configuration, the traveling wind entered the inside of the inner cowling from the ventilation hole is smoothly guided to the rear side along the wind guide wall, and the air resistance received by the inner cowling from the traveling wind can be reduced.

A fourth aspect is directed to the third aspect, in which the wind guide wall extends obliquely rearward to the rear side from an upper edge of the ventilation hole. According to this configuration, the wind guide wall is positioned on a back side of the ventilation hole, in a front view, and the inside of the inner cowling can be hidden by the wind guide wall.

A fifth aspect is directed to the third aspect or the fourth aspect, in which the wind guide wall extends from the ventilation hole toward an inlet (46) of an air cleaner. According to this configuration, it is possible to guide the traveling wind to the inlet of the air cleaner by the wind guide wall to improve the air intake efficiency.

A sixth aspect is directed to the fifth aspect, in which, in a side view, an extension line (L1) obtained by extending a downstream wall surface of the wind guide wall is located below the inlet of the air cleaner. According to this configuration, a direction of the traveling wind is directed downward than the inlet of the air cleaner by the wind guide wall, and intrusion of foreign matters such as sand into the inlet of the air cleaner can be prevented.

A seventh aspect is directed to any one aspect of the third aspect to the sixth aspect, in which an accommodation space for an electrical component (harness 47) is formed in the inner cowling, and the wind guide wall extends to separate a flow path of traveling wind entered from the ventilation hole and the accommodation space for the electrical component. According to this configuration, even if foreign matters such as sand or water droplets enter from the ventilation hole, the electrical component is protected from the foreign matters by the wind guide wall.

Although the present embodiment has been described, as another embodiment, the above-described embodiment and modification may be combined entirely or partially.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cowling structure for a straddle-type vehicle, the cowling structure comprising:

a front cowling covering a vehicle front portion from a front side; and a pair of side cowlings covering the vehicle front portion from lateral sides, wherein the pair of side cowlings each include:

an outer cowling forming an outer surface of the side cowling; and an inner cowling forming an inner surface of the side cowling, wherein the outer cowling and the inner cowling are overlapped in a left-right direction to form side cowling hollow, and wherein the inner cowling is formed with a ventilation hole through which traveling wind passing below the front cowling blows toward a rear side, wherein the inner cowling is formed with a bulging portion bulging toward an inner side in a vehicle width direction, and a lower wall of the bulging portion is inclined obliquely downward to the rear side, below the front cowling, and wherein the ventilation hole is formed in the lower wall of the bulging portion.

2. The cowling structure according to claim 1, wherein, in a side view of the vehicle, the outer cowling overlaps the ventilation hole of the inner cowling, and the outer cowling covers the ventilation hole of the inner cowling from an outer side in a vehicle-width direction.

3. The cowling structure according to claim 2,
wherein, in the side view of the vehicle, the outer cowling overlaps a rear edge of the ventilation hole of the inner cowling, and the outer cowling covers the ventilation hole of the inner cowling and a rear side of the ventilation hole from the outer side in the vehicle-width direction.

4. The cowling structure according to claim 2,
wherein, in the side view of the vehicle, the outer cowling fully overlaps the ventilation hole of the inner cowling.

5. The cowling structure according to claim 3,
wherein, in the side view of the vehicle, the outer cowling fully overlaps the ventilation hole of the inner cowling.

6. A cowling structure for a straddle-type vehicle, the cowling structure comprising:
a front cowling covering a vehicle front portion from a front side; and
a pair of side cowlings covering the vehicle front portion from lateral sides,
wherein the pair of side cowlings each include:
an outer cowling forming an outer surface of the side cowling; and
an inner cowling forming an inner surface of the side cowling,
wherein the outer cowling and the inner cowling are overlapped in a left-right direction to form side cowling hollow
wherein the inner cowling is formed with a ventilation hole through which traveling wind passing below the front cowling blows toward a rear side, and
wherein the inner cowling is formed with a wind guide wall configured to guide, to the rear side, traveling wind entered the ventilation hole.

7. The cowling structure according to claim 6,
wherein the wind guide wall extends obliquely rearward to the rear side from an upper edge of the ventilation hole.

8. The cowling structure according to claim 6,
wherein the wind guide wall extends, from the ventilation hole, toward an inlet of an air cleaner.

9. The cowling structure according to claim 8,
wherein, in a side view, an extension line obtained by extending a downstream wall surface of the wind guide wall is located below the inlet of the air cleaner.

10. The cowling structure according to claim 6,
wherein an accommodation space for an electrical component is formed in the inner cowling, and
the wind guide wall extends to separate a flow path of traveling wind entered from the ventilation hole and the accommodation space for the electrical component.

11. A cowling structure for a straddle-type vehicle, the cowling structure comprising:
a front cowling covering a vehicle front portion from a front side; and
a pair of side cowlings covering the vehicle front portion from lateral sides,
wherein the pair of side cowlings each include:
an outer cowling forming an outer surface of the side cowling; and
an inner cowling forming an inner surface of the side cowling,
wherein the inner cowling is formed with a ventilation hole through which traveling wind passing below the front cowling blows toward a rear side,
wherein the inner cowling is formed with a wind guide wall configured to guide, to the rear side, traveling wind entered the ventilation hole,
wherein the wind guide wall extends, from the ventilation hole, toward an inlet of an air cleaner, and
wherein, in a side view, an extension line obtained by extending a downstream wall surface of the wind guide wall is located below the inlet of the air cleaner.

* * * * *